United States Patent [19]

Altenpohl

[11] Patent Number: 4,711,344
[45] Date of Patent: Dec. 8, 1987

[54] ACCURATE WEIGHT SORTING ARRANGEMENT FOR POULTRY CONVEYOR SYSTEM

[76] Inventor: Paul J. Altenpohl, 1211 Lafayette Rd., Gladwyne, Pa. 19035

[21] Appl. No.: 817,407

[22] Filed: Jan. 9, 1986

[51] Int. Cl.$^4$ ............................................ G01G 11/00
[52] U.S. Cl. ..................................... 198/504; 177/163
[58] Field of Search ...................... 198/504, 505, 465.4; 209/593, 595; 177/163

[56] References Cited

U.S. PATENT DOCUMENTS

| | | | |
|---|---|---|---|
| 3,184,042 | 5/1965 | Rutkovsky et al. | 198/362 X |
| 3,642,130 | 2/1972 | Altenpohl | 177/163 X |
| 4,148,397 | 4/1979 | Altenpohl et al. | 209/559 |
| 4,359,945 | 11/1982 | Brems et al. | 198/465.4 |
| 4,473,011 | 9/1984 | Wuschek | 198/465.4 |

Primary Examiner—Robert J. Spar
Assistant Examiner—Cheryl L. Gastineau
Attorney, Agent, or Firm—Fleit, Jacobson, Cohn & Price

[57] ABSTRACT

The length of loading platforms in a conveyor weight sorting system are greater than the uniform spacing between successive load carriers suspended by the conveyor to achieve acceptable accuracy for weight limit detection by laterally spacing the loading platforms in parallel spaced relation to the common conveyor path, thereby loading different groups of the load carriers non-consecutively during travel through the weight sorting station.

12 Claims, 11 Drawing Figures

ACCURATE WEIGHT SORTING ARRANGEMENT FOR POULTRY CONVEYOR SYSTEM

BACKGROUND OF THE INVENTION

Field of the Invention

This invention relates to the sorting of objects or products such as poultry during travel along a predetermined path suspended by load carriers from a conveyor. Conveyor associated weight sorting systems to which the present invention pertains, are already well known as disclosed for example in U.S. Pat. No. 4,148,397. In such weight sorting systems, poultry shackle types of load carriers are suspended in uniformly spaced relation to each other from an overhead conveyor. The carriers are elevated onto a fixed track at a weighing station to gravitationally unload of the conveyor chain which continues to pull the carriers through the weighing station with the gravitational loading transferred to the track by load supporting track wheels on the carriers. Loading platforms are mounted in alignment along the track for limited vertical displacement when loaded above preset weight limits as determined by the setting of scale beam types of detectors respectively connected to the loading platforms. These detectors generate load release signals applied to a load release mechanism by means of which products such as poultry outside of a preset weight range are dropped from the conveyor line. Two loading platforms are therefore utilized with detectors set to drop such loads so that only loads within the preset weight range continue beyond the weighing station for processing.

In the foregoing type of weight sorting system, the loading Platforms associated with a single conveyor line are longitudinally spaced from each other and aligned with uniformly spaced carrier track wheels to sequentially detect loading above load limits as aforementioned. Accuracy of load limit detection depends on the speed of the conveyor and the spacing between carriers which determine the duration of loading of each loading platform. Apparently because the load limit detecting action involves gravitational displacement of the loading platform out of horizontal alignment with a fixed track, detection accuracy is unacceptably lowered when the loading duration is decreased below some minimum time period. Therefore, the minimum loading duration imposes a dimensional restriction on the platform length, the conveyor speed and the carrier spacing. While it would be obvious to increase the length of the loading platforms to insure accuracy, any increase is limited by the geometrical restriction necessary to obtain load limit detection of each carrier one at a time without interference. Thus, the length of the loading platform was heretofore made less than the spacing between carriers by an amount required to accommodate swing of the suspension links connecting the carriers to the conveyor thereby avoiding any simultaneous loading of a platform by two carriers.

It is therefore an important object of the present invention to provide a weight sorting system for a single conveyor line operated at a production rate exceeding the maximum rate above which acceptable load lLmit detection accuracy was heretofore deemed possible.

A further object of the invention is to provide a weight sorting system having acceptable load limit detection accuracy for a given conveyor speed despite the use of additional load carriers decreasing the spacing between successive carriers on a single conveyor line, the use of additional carriers on the same conveyor line being desirable for functions unrelated to the weight sorting operation, such as product grading.

Other objects of the present invention relate in general to providing an acceptably accurate, weight sorting system for a single conveyor line with greater design flexibility to meet various product processing requirements.

SUMMARY OF THE INVENTION

In accordance with the present invention, uniformly spaced load carriers suspended from a common conveyor line are divided into at least two groups arranged in non-consecutive order, i.e., successive carriers being in a different group. The two groups of carriers differ from each other in the lateral spacing between support wheels through which the carrier loads are transferred from the conveyor chain to the fixed track during travel through the weight sorting station. Loading platforms longitudinally spaced along the fixed track of the weight sorting station for respectively detecting different weight limits, are also laterally spaced from each other relative to the common travel path of the carrier bodies which are suspended between laterally spaced sections of the fixed track. The loading platforms are thereby respectively aligned with the support wheels of the different groups of carriers along parallel spaced paths on the track sections. As a result of such arrangement of laterally spaced loading platforms and load transferring support wheels aligned therewith, the loading platforms may be made of lengths measured along the common carrier travel path greater than the spacing between successive carriers. The loading duration associated with each platform is thereby correspondingly increased to provide greater flexibility in the selection of conveyor speed, successive carrier spacing and production rate in order to meet different product processing requirements unrelated to the weight sorting operation.

According to one application of the present invention, a conveyor system may be originally designed with reduced spacing between successive carriers or modified by the use of adaptors to increase the number of carriers on the line in order to accommodate the grading of poultry by way of example. Poultry loads may thereby be placed by grade on the aforementioned different groups of carriers at vertically different levels. Despite the reduced spacing between successive carriers, acceptable accuracy is achieved with respect to the load limit detecting operation without reducing conveyor speed or sacrificing production rate.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENTS

Figure 1:
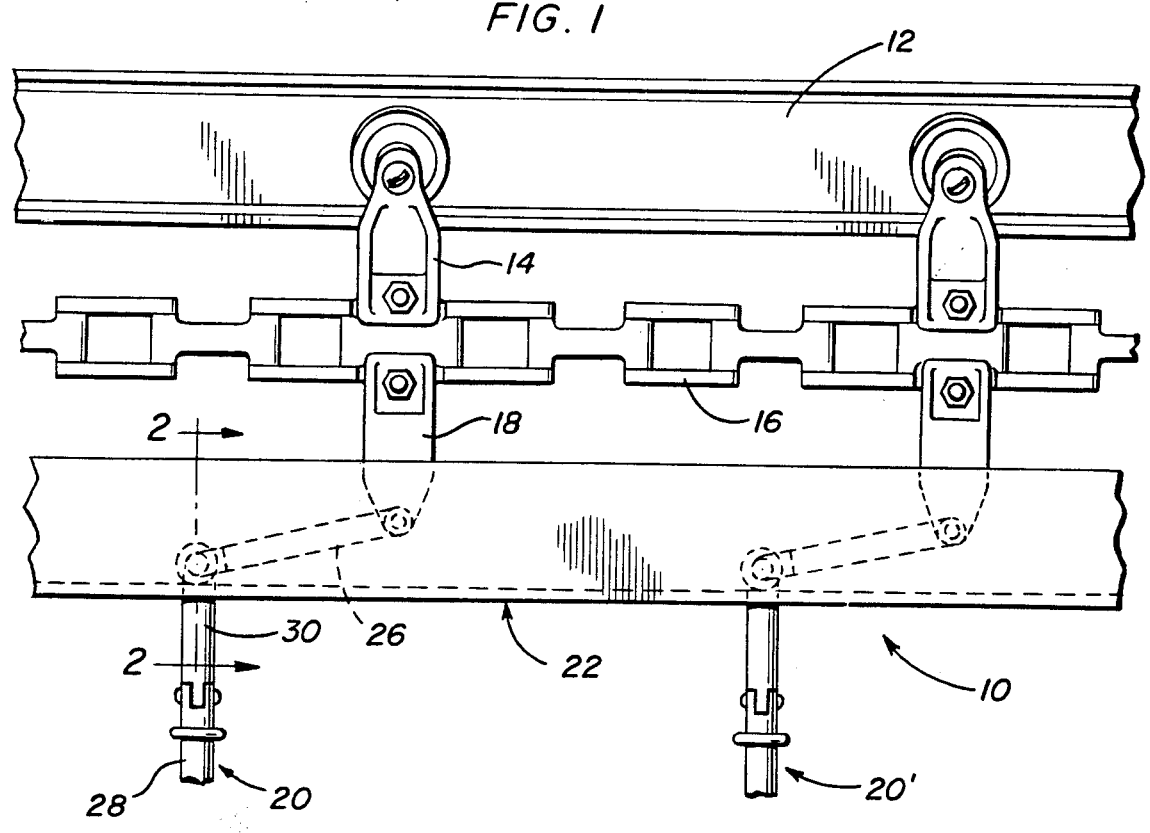
FIG. 1 is a partial side elevation view of a typical overhead conveyor system extending through a weight sorting station, modified in accordance with the present invention.
Figure 2:
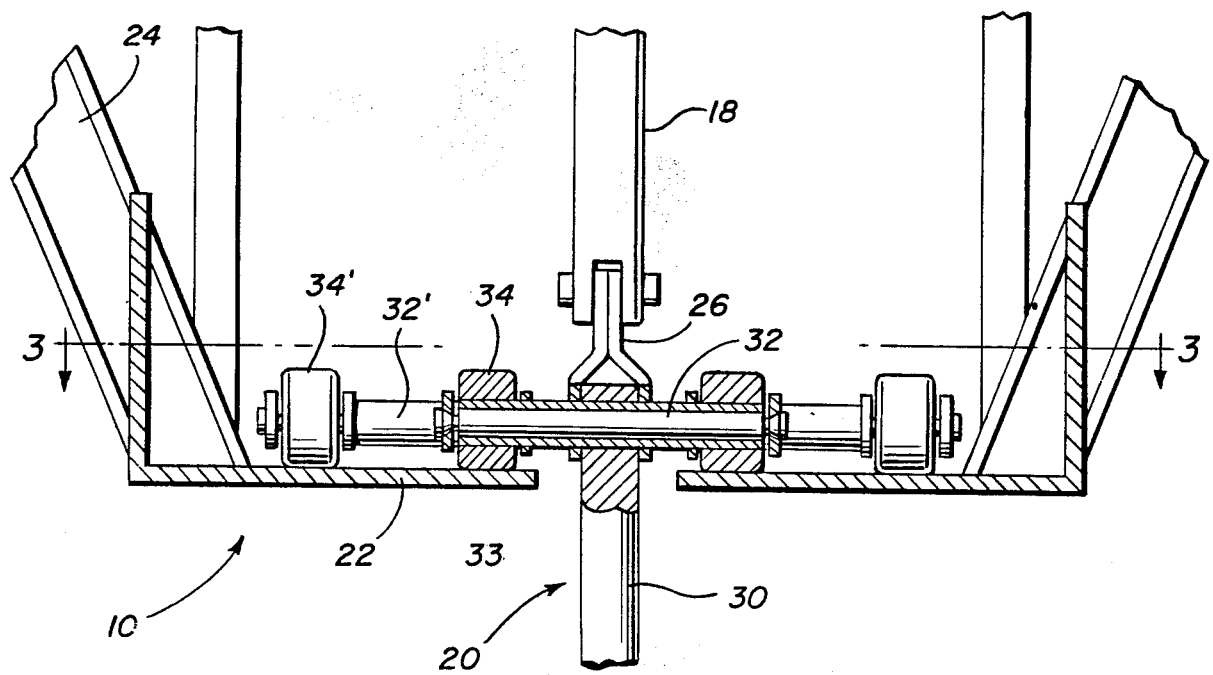
FIG. 2 is an enlarged partial section view taken substantially through a plane indicated by section line 2—2 in FIG. 1.

Referring now to the drawings in detail, FIGS. 1 through 5 illustrate a portion of an overhead poultry conveyor system extending through a weight sorting station generally referred to by reference numeral 10. The construction shown in FIGS. 1 and 2 is generally typical except for its modification in accordance with the present invention.

The conveyor construction shown includes a horizontal I-beam 12 fixedly mounted for guiding travel of a plurality of roller assemblies 14 from which a conveyor chain 16 is suspended just below the I-beam. Connectors 18 are secured to the conveyor chain in vertical alignment with the roller assembly 14 from which load carriers 20 and 20' in the form of poultry shackle assemblies, are suspended. As is well known in the art, successive load carriers and associated conveyor chain connectors 18 are uniformly or equally spaced from each other along the conveyor chain which is power driven to cause travel of the load carriers along a common conveyor path extending through a plurality of product or poultry processing stations, including the weight sorting station 10 shown. The weight sorting system is also generally well known in the art in that it includes a track formed by a pair of closely spaced track sections 22 held fixed in parallel spaced relation below the conveyor guide beam 12 by suspension posts 24, for example, as shown in FIG. 2. Each connector 18 is pivotally connected to a load carrier by a pulling link 26 as also shown in FIG. 2.

Each load carrier 20 or 20' includes an elongated body 28 pivotally connected at its upper end to a suspension link 30. The suspension link is pivotally connected at its upper end to the pulling link 26 by means of a support shaft 32 just below the track section 22 from which the link 30 depends through a gap 33 formed between the track sections along which a common path of travel is established by the conveyor system. A pair of support wheels or rollers 34 are journaled on the ends of the support shaft 32. While traveling through the weight sorting station, each load carrier has its load supported by the support wheels on the fixed track along which the carrier is pulled by the conveyor chain 16 through one of the pulling links 26.

Figure 3:
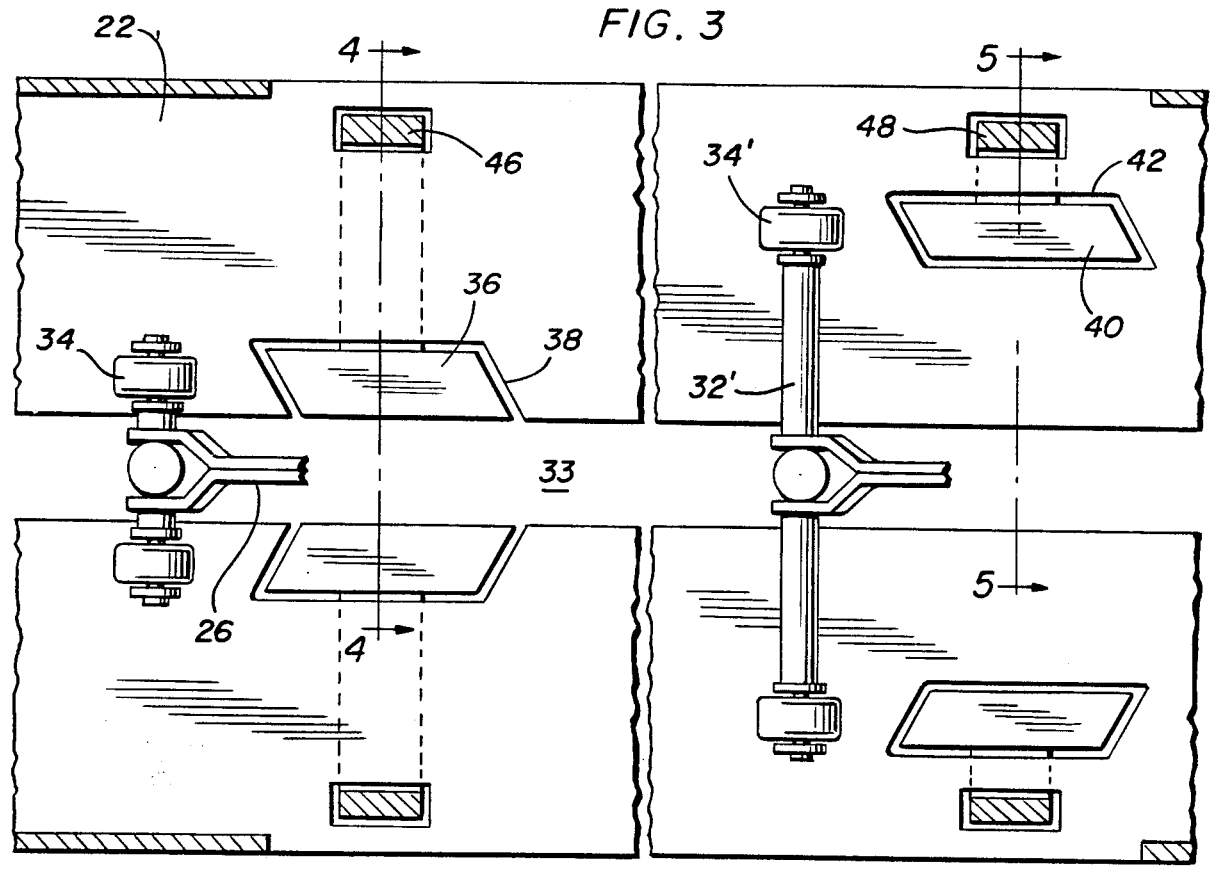
FIG. 3 is a top section view taken substantially through a plane indicated by section line 2—2 in FIG. 1.

In accordance with an embodiment of the present invention, the load carriers are divided into at least two groups which are of identical construction as hereinbefore described except for the lengths of the support shafts. Thus, the carriers 20 forming one group have support shafts 32 of a relatively short length so that the support wheels 34 are close to the edges of the track gap 33 as shown in FIGS. 2 and 3. The carriers 20' on the other hand, form the other group of carriers and have support shafts 34' of a relatively long length with support wheels 34' at the ends thereof as shown in FIGS. 2 and 3. Thus, the two groups of carriers 20 and 20' track along parallel paths laterally spaced from each other relative to the common conveyor path.

Figure 4:
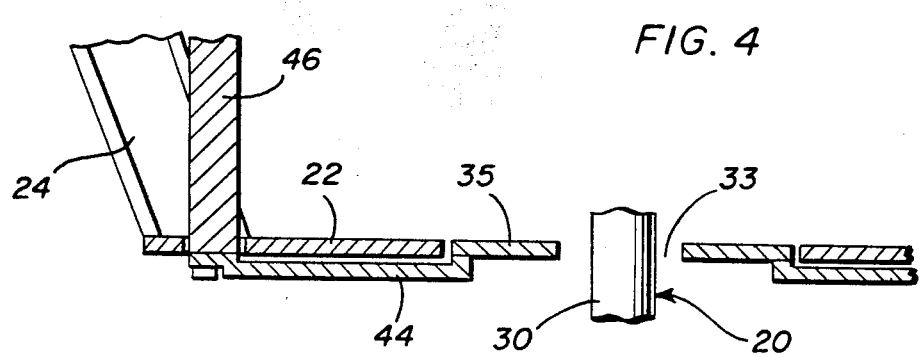
FIGS. 4 and 5 are partial section views taken substantially through planes indicated by section lines 4—4 and 5—5 in FIG. 3.
Figure 5:
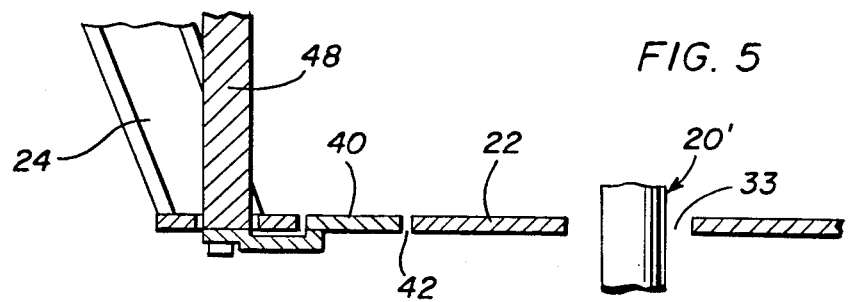

As shown in FIGS. 3, 4 and 5, the load support wheels 34 of one group of carriers 20 are aligned with a pair of loading platforms 36 exposed through cut-outs 38 in the track sections which open into the gap 33. A second pair of loading platforms 40 are exposed through openings 42 in the track section in alignment with the paths of the support wheels 34' associated with the group of carriers 20'. The loading platforms 36 and 40 are therefore laterally spaced from each other relative to the gap 33 as well as longitudinally spaced along the direction of the gap through which the common conveyor path extends. The length of the platforms 36 and 40 are greater than the uniform spacing between successive carriers 20 and 20' for purposes to be explained in detail hereinafter. The platforms 36 are interconnected, by horizontal connector portions 44 underlying the track section 22, with a vertically extending loading post 46 as shown in FIGS. 3 and 4. The loading platforms 40 are connected to associated loading posts 48. The loading posts 46 and 48 are respectively connected to load limit detectors as will be described hereinafter.

Figure 6:
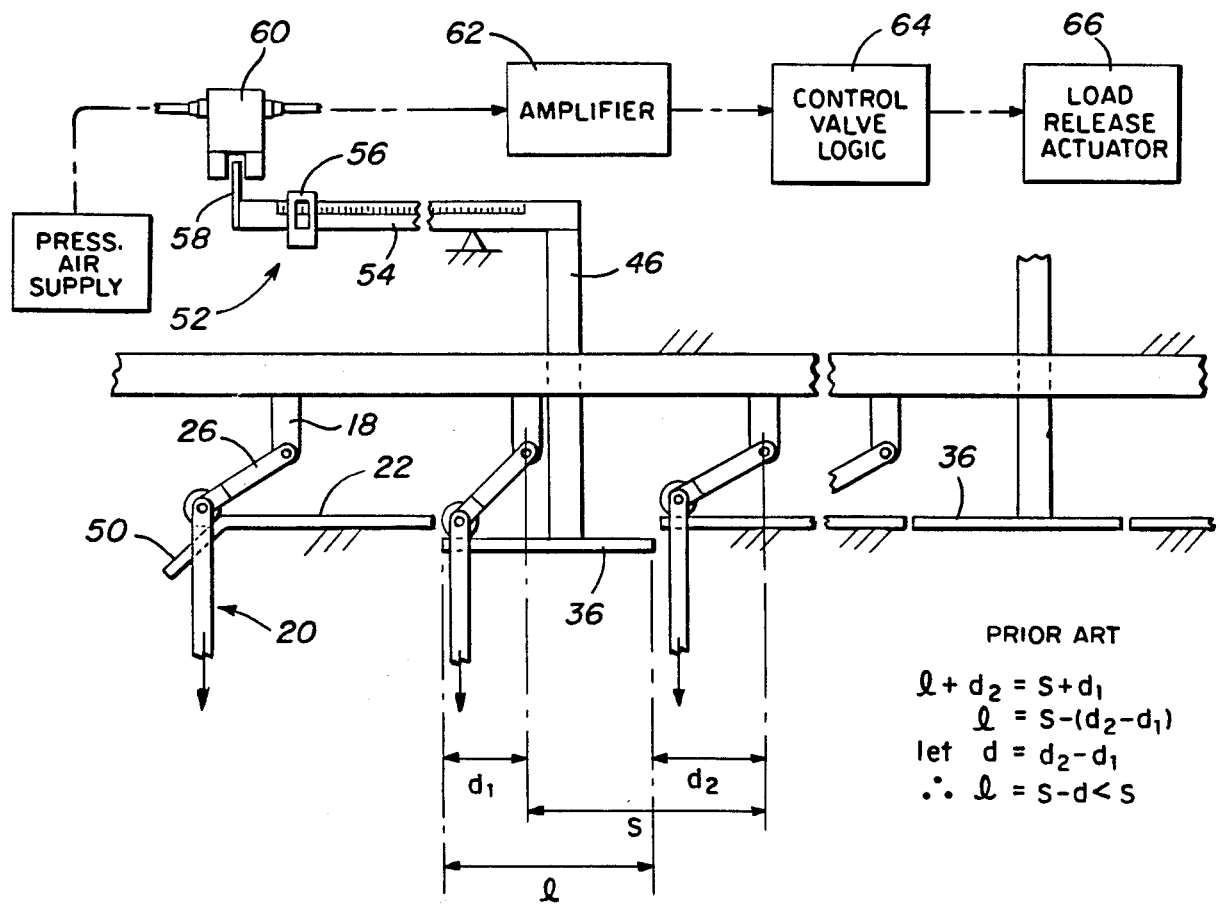
FIG. 6 is a simplified or schematic elevation view of a standard overhead conveyor extending through a weight sorting station.

FIG. 6 illustrates in a somewhat simplified fashion a typical overhead conveyor corresponding to the description of FIGS. 1 and 2 having equally spaced connectors 18 depending from the conveyor chain 16. Identical load carriers 20 are shown connected by pulling links 26 to the connectors. The carrier loads supported on the fixed track section 22 are transferred from the conveyor chain as the support wheels 34 are pulled up the ramp 50 into the weight sorting station. A load limit detector 52 is provided for each of the two loading platforms 36 in accordance with the prior art as disclosed for example in U.S. Pat. No. 4,148,397 aforementioned. The load limit detectors may be of the scale beam type as shown, including a fulcrum scale lever beam 54 to which the loading post 46 connects the loading platform 36. The load limit to be detected is selected by positioning of an adjustment weight 56 on the scale lever beam, one end of which has a trigger element 58 projecting into a fluidic sensor 60. Thus, when the platform is loaded above the load limit preset through adjustable weight 56, it is gravitationally displaced downwardly by a limited amount from coplanar relation to the track section 22 to actuate trigger element 58. A logic signal is thereby generated by sensor 60 and fed through amplifier 62 to a control valve 64 in order to operate a load releasing actuator 66. Loads above the preset load limit are thereby dropped from the successive carriers 20 being monitored on the loading platforms as is already well known in the art. Two such loading platforms 36 and associated detectors 52 sequentially monitor moving carrier loads in order to drop all loads outside a weight range determined by the preset weight limits. Only loads within such weight range continue on the conveyor toward various product processing stations.

As shown in FIG. 6, successive carriers 20 are equally spaced from each other along the common conveyor by a distance (S). Further, because of the swing of the pulling links 26, the carriers are displaced toward each other a net distance of (d) in the direction of travel in response to the aforementioned vertical displacement of the loading platform. Therefore, the maximum length (1) of the loading platform must be (S−d) in order to sequentially monitor each load carrier, one at a time, and avoid simultaneous loading of a platform by two consecutive load carriers which would of course produce a detection error. According to present practice for poultry processing, the spacing (S) between consecutive carriers is six inches while the length selected for the platforms to obtain acceptable detection accuracy is four inches. Such practice in the poultry processing art is based on a conveyor speed producing a production rate of approximately 6,000 loads per hour.

Figure 10:
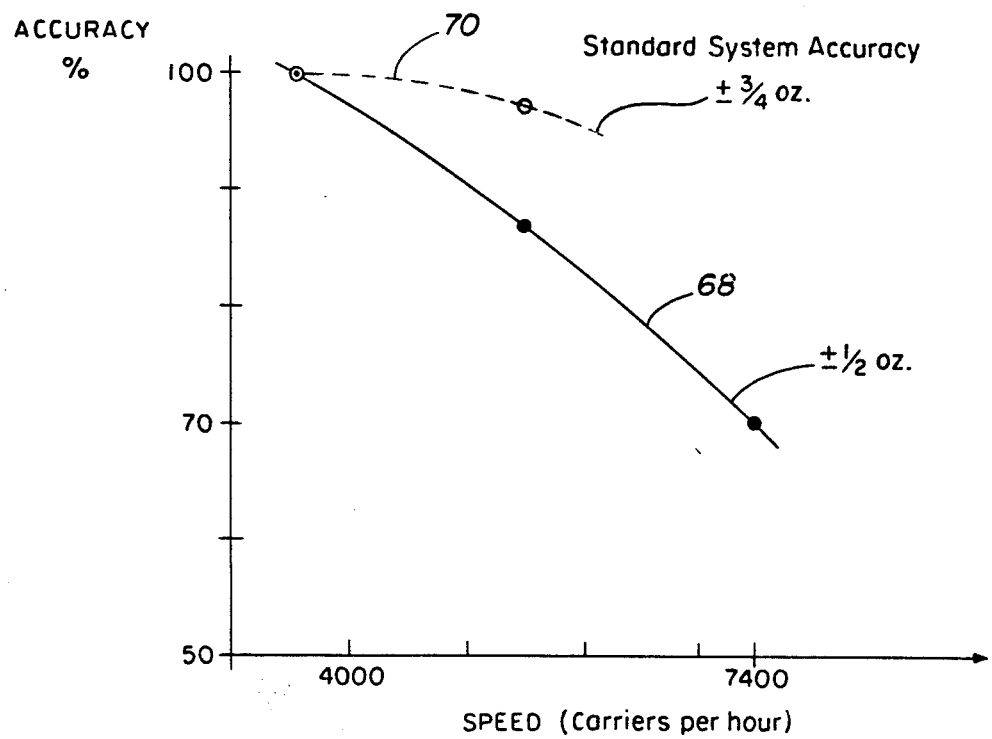
FIGS. 10 and 11 are graphical illustrations depicting various comparative characteristics associated with load limit detection.
Figure 11:
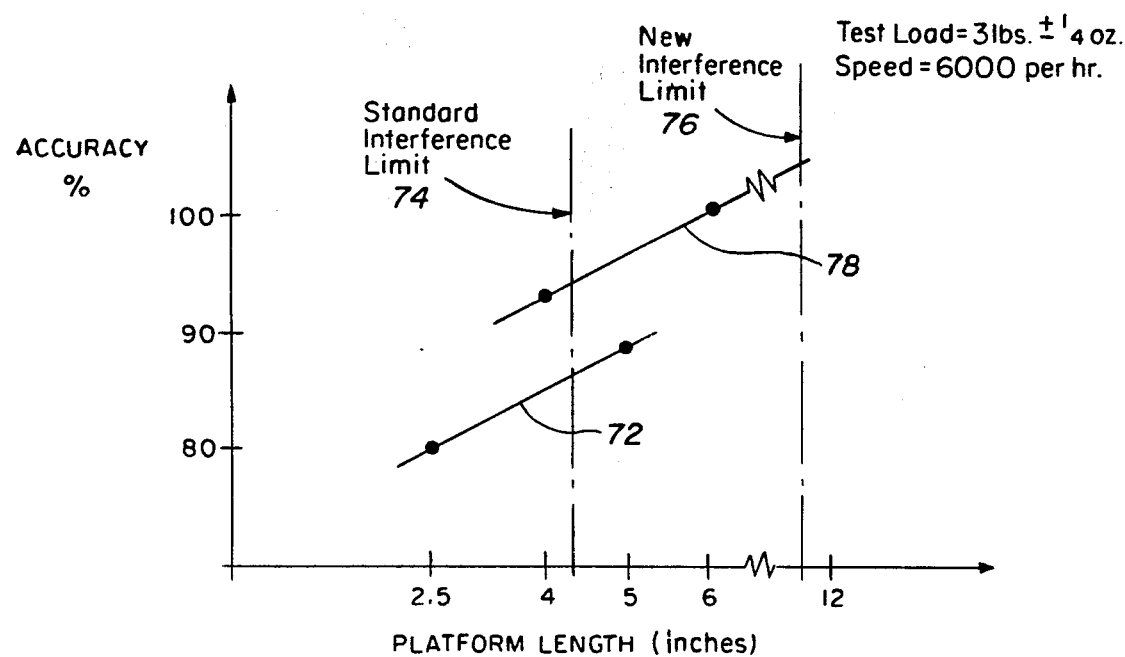

It has been empirically discovered that any significant increase in conveyor speed or reduction in carrier spacing of a standard weight sorting system to increase the production rate, decreases the accuracy of load limit detection below an acceptable percentage as depicted by curves 68 and 70 in FIG. 10. It has also been empirically discovered that detection accuracy is a direct function of platform length as depicted by curve 72 in FIG. 11, with respect to a standard prior art weight detection system at the standard production rate of 6,000 per hour and with carrier spacing of six inches. As also shown in FIG. 11, detection accuracy is limited to a maximum length of a little above four inches as denoted by limit line 74, above which detector error occurs because of simultaneous platform loading as aforementioned. In accordance with the present invention, however, the maximum platform length is increased above the carrier spacing of six inches for the same conveyor system and conveyor speed, as indicated by limit line 76, with improved detection accuracy as depicted by curve 78 in FIG. 11. Detection accuracy is apparently improved because of the increased duration during which the loading platforms are loaded by each carrier when the weight sorting system is modified in accordance with the present invention.

Figure 7:
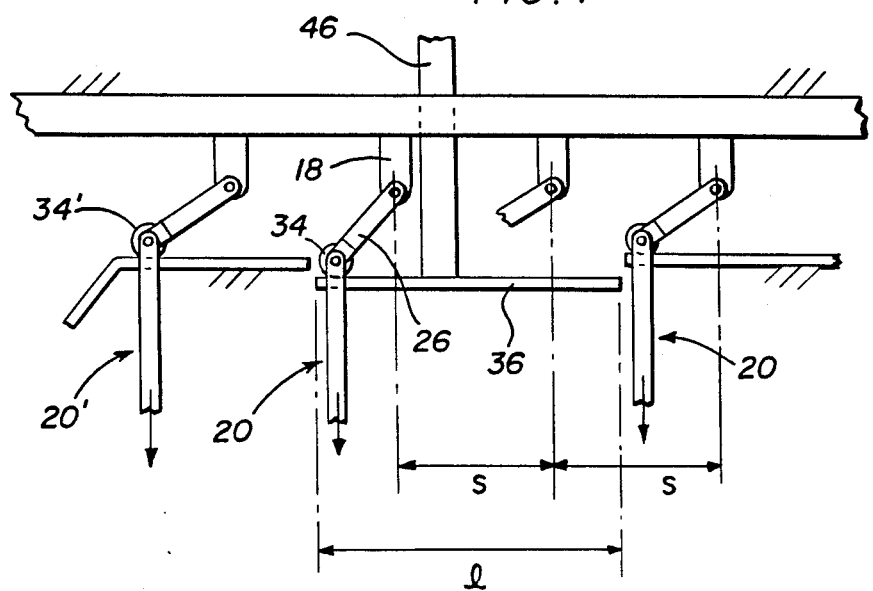
FIG. 7 is a simplifed side elevation view corresponding to that of FIG. 6 showing a weight sorting station modified in accordance with the present invention, corresponding to the arrangement shown in FIGS. 1—5.
Figure 8:
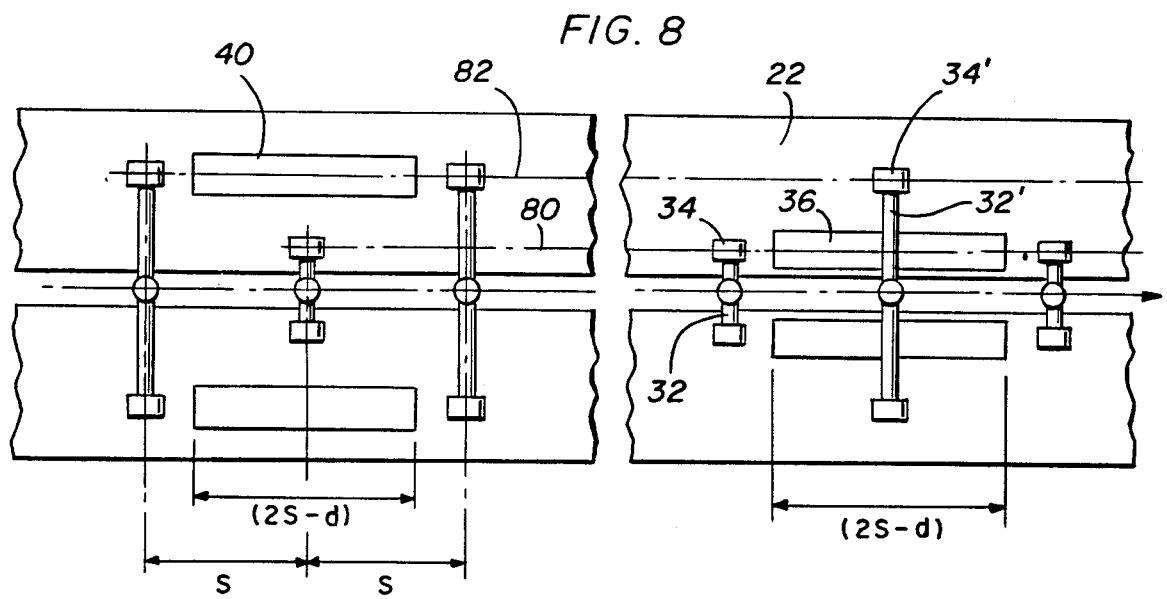
FIG. 8 is simplified top plan view of the modified weight sorting station arrangement shown in FIG. 7.

The arrangement of the present invention as hereinbefore described with respect to FIGS. 1-5, is schematically shown in FIGS. 7 and 8 for purposes of geometric comparison with the standard arrangement of FIG. 6. Each load platform 36 and 40 monitors nonconsecutive load carriers 20 or 20' (alternately positioned in the illustrated embodiment) so that the spacing (S) between successive carriers is not a limiting factor. Thus, for the embodiment shown, the maximum platform length (1) is (2S−d). Such non-consecutive load monitoring operation is achieved by use of closely spaced support wheels 34 aligned along paths 80 with the loading platforms 36 and the more widely spaced support wheels 34' aligned along parallel spaced paths 82 with the loading platforms 40 as shown in FIG. 8.

Figure 9:
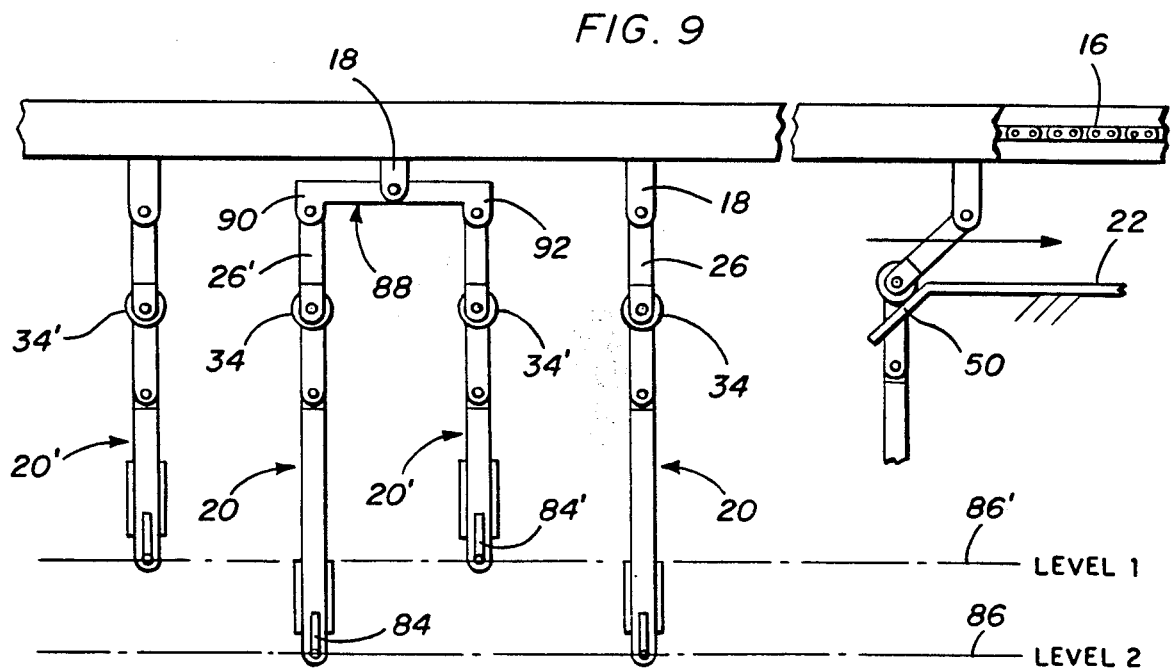
FIG. 9 is a simplifed partial side elevation view showing a conveyor system modified in accordance with one embodiment of the present invention.

As hereinbefore indicated, the load carriers are divided into two groups of carriers 20 and 20', distinguished from each other by the lateral spacing of their support wheels 34 or 34'. FIG. 9 illustrates another distinction imposed on such load carriers in accordance with one embodiment of the invention. Load carriers 20 of one group for example are longer than the carriers 20' of the other group. Accordingly, the load engaging hooks at the lower ends of the carriers 20 are at a lower level 86 than the hooks 84' of the carriers 20' at a higher level 86'. Use of such a multi-level carrier arrangement facilitates a grading operation in which products of one grade are suspended at one level and products of another grade at a different level. Because of such grading, the numbers of carriers in use at each level is reduced so that more carriers at each level should be added to an existing conveyor line for more efficient use thereof. To do so, would reduce the spacing between successive carriers. However, such reduction in spacing can only be tolerated with acceptable detection accuracy in a weight sorting system modified in accordance with the present invention as hereinbefore described.

According to the embodiment shown in FIG. 9, the spacing between successive load carriers of an existing standard conveyor line is reduced by mounting adapters 88 on alternate conveyor chain connectors 18. Two connecting projections 90 and 92 depend from the longitudinally ends of each adapter to suspend a pair of pulling links 26' to which two successive carriers 20 and 20' are connected. The carriers suspended directly from all alternate connectors 18 and from the adapters 88 are pulled up the ramp 50 and through the weight sorting system to undergo a weight sorting operation as hereinbefore described with respect to FIGS. 1-5, 7 and 8.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a weight sorting system for products held by consecutive carriers traveling along a common path suspended from a conveyor in spaced relation to each other, including a fixed track laterally spaced from said path, at least two longitudinally spaced platforms loaded by said carriers during travel thereof along said common path, and means for detecting preset loading of said platforms in response to gravitational displacement thereof relative to the track, the improvement comprising, means operatively mounting the two platforms in operative alignment with said track and in longitudinally and laterally spaced relation to each other, and track engaging devices mounted to consecutive carriers for transferring the load of said carriers to said platforms, said consecutive track engaging devices being respectively laterally spaced by different amounts from the common path for transferring the respective loading of consecutive carriers to the respective laterally spaced platforms.

2. The combination of claim 1 wherein the consecutive carriers suspended from the conveyor are uniformly spaced from each other along said common path by a distance (S) and are displacable relative to each other along said common path by distance (d), in response to said gravitational displacement of the platforms, each of said platforms having a length measured along said common path between (S) and (2S−d).

3. The improvement as defined in claim 2 wherein said carriers are divided into two groups of respectively different lengths suspending the products at different levels below the conveyor.

4. In a weight sorting system for objects held by consecutive carriers suspended from a conveyor while traveling along a common path, said consecutive carriers being uniformly spaced from each other along said common path by a distance (S), including a fixed track, at least one platform, means operatively mounting the platform in alignment with the track for sequential loading only by non-consecutive carriers during said travel along the path and means for detecting a preset limit of said loading of the platform by the non-consecutive carriers, said platform having a length measured along said common path greaterr than (S).

5. The system as defined in claim 4 including a second platform of substantially equal length as the first mentioned platform and means operatively mounting the second plaform in laterally spaced relation to the first mentioned platform relative to the common path for sequential loading by different ones of non-consecutive carriers.

6. The system as defined in claim 5 wherein each of said carriers includes a vertically elongated body aligned with said common path and track supported means extending laterally from the body in alignment with one of said laterally spaced platforms for engagement therewith.

7. The system as defined in claim 6 wherein each of the laterally spaced platforms and the track supported means sequentially engaged therewith are equally spaced laterally from the common path.

8. In a detection system for moving objects held by consecutive carriers suspended from a common conveyor, said consecutive carriers being uniformly longitudinally spaced from each other by a predetermined distance, including at least two longitudinally spaced loading platforms the improvement comprising a load support means mounted on each of the consecutive carriers for travel therewith consecutive load support means being laterally spaced different amounts from the common conveyor along respective parallel spaced paths, and means mounting said platforms in alignment with said respective parallel paths for engagement by respective non-consecutive load support means during travel with the carriers each of said platforms having lengths measured along said paths greater than the predetermined distance by which the consecutive carriers are uniformly longitudinally spaced.

9. The system as defined in claim 8 wherein each of the platforms and the load support means engaged therewith are equally spaced laterally from the common conveyor.

10. The system of claim 8 wherein consecutive carriers are suspended from the conveyor in alternate positions thereon.

11. In combination with a conveyor, a plurality of consecutive load carriers suspended from the conveyor for travel along a common path in uniformly longitudinally spaced relation to each other, a plurality of loading platforms, means for detecting loading of the platforms by the carriers above preset limits with an accuracy dependent on speed of travel and longitudinal spacing between the consecutive carriers during said travel along the common path, and means for establishing acceptable accuracy of said detecting means including means mounting the loading plaforms in laterally spaced relation to each other relative to said common path, said platforms having lengths measured along said path establishing a duration of loading above a minimum necessary for said acceptable accuracy and load support means connected to each of the carriers for correspondingly loading each of the platforms only by non-consecutive carriers said lengths of the platforms being greater than the spacing between the consecutive carriers.

12. The combination of claim 11 wherein the number of the loading platforms is two and the consecutive and non-consecutive carriers are suspended in alternate positions on the conveyor.

* * * * *